United States Patent [19]

Marjollet et al.

[11] 4,184,785
[45] Jan. 22, 1980

[54] AXIALLY BOLTED FLANGE JOINT

[75] Inventors: Jacques Marjollet, Paris; Jean-Jacques Marsault, Meudon, both of France

[73] Assignee: Stein Industrie S.A., Villacoublay, France

[21] Appl. No.: 888,157

[22] Filed: Mar. 17, 1978

Related U.S. Application Data

[63] Continuation of Ser. No. 733,945, Oct. 19, 1976.

[30] Foreign Application Priority Data

Oct. 22, 1975 [FR] France .................. 75 32299

[51] Int. Cl.² ................ F16D 1/00; F16L 23/00
[52] U.S. Cl. ................ 403/337; 403/388; 403/408

[58] Field of Search ............ 403/266, 337, 388, 408, 403/370, 371, 372, 374, 376, 286, 293, 13, 14, 23, 24, 25, 344; 285/DIG. 18, 286, 363, 405, 412; 85/8.3; 220/327

[56] References Cited

U.S. PATENT DOCUMENTS 2,972,275  2/1961  Baubles .................. 85/8.3

Primary Examiner—Wayne L. Shedd
Attorney, Agent, or Firm—Haseltine, Lake & Waters

[57] ABSTRACT

An assembly of two plane flanges of possibly different flexibilities clamped together by studs. It comprises sealing means including a lip weld in the plane of the join and centering rings disposed around each stud in each bore. Application to flanges connected to asymmetrical structures such as a collar and a cover.

5 Claims, 1 Drawing Figure

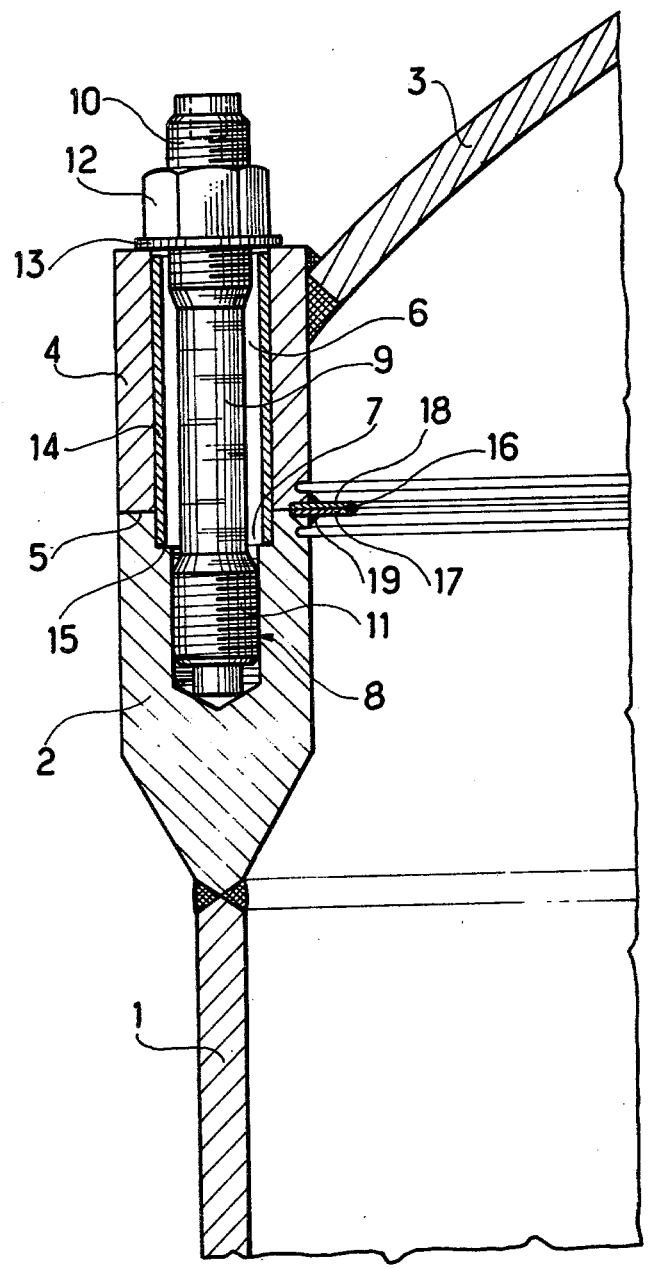

AXIALLY BOLTED FLANGE JOINT

This is a continuation of application Ser. No. 733,945 filed Oct. 19, 1976.

The present invention relates to a device for assembling two plane flanges clamped together by studs passing through the holes of the flanges and in particular to the assembly of flanges associated respectively with a collar and a cover of a pressurized receptacle. The flanges need not have the same flexibility.

In such assemblies, sealing is generally ensured between the flanges by a lip weld in the plane of the join. This weld however can provide mechanical strength and sealing during operation only if it is not subjected to shearing forces resulting from relative movement between the two flanges.

Accurate positioning of the two flanges in relation to each other can be provided by cylindrical jointing, one of the flanges being male and the other female. However, this requires that precise tolerances be adhered to, hence leading to high manufacturing costs and becomes unfeasible in the case of large diameters, e.g. one meter and more. Nonetheless more and more large-sized equipment is being produced.

The aim of the present invention is to enable the assembly of two flanges of different or same flexibility, without machining the flanges (which would entail adhereing to precise tolerances) and by means of currently used parts and at a particularly low manufacturing cost.

The present invention provides an assembly comprising two plane flanges clamped together by studs received in bores in the flanges, the assembly including sealing means including a lip weld in the plane of the join and centring rings disposed around the studs in their bores.

It preferably further includes at least one of the following characteristics:

the lip weld is effected between two thin metal sheets applied against each other and embedded between the flanges in the internal part of the flanges;

the centring rings are cylindrical and are either elastic or fitted to the bores;

the centring rings are made of metal having high elastic limit.

An assembly device for flanges welded respectively to the collar and the cover of a pressurized receptacle is described hereinbelow by way of an example and with reference to the single FIGURE of the accompanying drawing, showing a cross-section thereof.

A flange 2 is welded to the cylindrical collar 1 of a reservoir, while a flange 4 is welded to a cover 3, the two flanges coming in contact with each other along a join plane 5. The flange 4 is provided with cylindrical bores such as 6 at regular intervals along its length and the flange 2 has corresponding blind holes with a slightly smaller diameter, such as 7, with a tapped part 8. A stud 9 with threaded ends 10 and 11 is screwed into the tapped part 8 of each hole 7, clamping being provided by tightening a nut 12 against the top face of the flange 4, a washer 13 being interposed between the nut 12 and the flange 4.

The centring of the bores 6 in relation to the holes 7 is provided by a cylindrical ring 14 split along a generatrix, made for example of spring steel in the case of the receptacle being made of steel. The split ring 14 rests by its bottom edge on an internal shoulder 15 of the blind hole 7. The height of the ring 14 is such that its top end is very close to the top plane surface of the flange 4, without quite reaching it so as to enable differential heat expansion without its being deformed. The ring 14 could, however, also be embedded between the shoulder 15 and a corresponding shoulder of the top flange 4.

Sealing is ensured by a lip weld 16 between two metal sheets 17 and 18, embedded between the flanges 2 and 4 in the join plane and is completed by welds 19 between the metal sheets 17 and 18 and the internal walls of the flanges. The sealing weld could also be formed on lips on either side of the join plane, defined by machined grooves in the internal surfaces of the flanges in the vicinity of the join plane.

In an assembly device of this type, the studs 9 withstand the internal pressure, the rings 14 withstand deformations between the two flanges 2 and 4 due to any differences in their flexibilities and the internal lip weld 16 provides sealing.

It will be understood that various changes can be made to the device which has just been described without going beyond the scope of the invention. In particular, the flanges can have a shape which is other than circular, e.g. oval, square or rectangular with rounded corners, with a view to adapting them to the elements to be assembled.

Any other element for improving the seal can be added to this device.

The assembly device according to the invention applies particularly but not exclusively to flanges on asymmetrical structures (e.g. collar and cover or bottom, manhole cover and manhole, etc.).

What we claim is:

1. An assembly comprising two plane flanges, said flanges having bores formed therein to permit joining of said flanges by studs received in said bores, the assembly including: sealing means having an inner lip weld formed in the plane of the joint of the flanges, being disposed inside of the inner periphery of the flanges and centering rings disposed around the studs in their respective bores.

2. An assembly according to claim 1, wherein: the lip weld is effected between two thin flat metal sheets in contact with each other substantially in the joint plane and embedded in the inside edges of the respective flanges.

3. An assembly according to claim 1 wherein the centering rings are split along a generatrix and fit the bores by virtue of radial elasticity.

4. An assembly according to claim 3, wherein: the centring sleeves are made of metal having a high elastic limit.

5. An assembly according to claim 1, wherein: one of the flanges is provided with blind bores having an internal shoulder, thereby defining an upper part of larger diameter and a lower part of smaller diameter and the total height of the centering sleeves is less than the sum of the depth of the upper part of the blind bores extending down to said shoulder and of the corresponding bores of the other flange, whereby differential thermal expansion of the flanges and of the centering sleeves are free of deformation of the centering sleeves.

* * * * *